April 13, 1965 W. G. KOGEL 3,177,675
DEFROSTING ARRANGEMENT AND CONTROL FOR REFRIGERATION APPARATUS
Filed March 16, 1962 6 Sheets-Sheet 1

FIG.1

INVENTOR.
Wilhelm Georg Kogel
BY
his ATTORNEY

FIG.6  FIG.7

April 13, 1965 W. G. KOGEL 3,177,675
DEFROSTING ARRANGEMENT AND CONTROL FOR REFRIGERATION APPARATUS
Filed March 16, 1962 6 Sheets-Sheet 6

FIG.8

INVENTOR.
Wilhelm Georg Kogel
BY
his ATTORNEY

United States Patent Office 3,177,675
Patented Apr. 13, 1965

3,177,675
DEFROSTING ARRANGEMENT AND CONTROL
FOR REFRIGERATION APPARATUS
Wilhelm Georg Kogel, Stockholm, Sweden, assignor to
Aktiebolaget Electrolux, Stockholm, Sweden, a corporation of Sweden
Filed Mar. 16, 1962, Ser. No. 180,272
Claims priority, application Sweden, Mar. 20, 1961,
2,975/61
14 Claims. (Cl. 62—148)

My invention relates to refrigeration and is concerned with the defrosting of cooling units of absorption refrigeration systems and a control for starting and stopping the defrosting.

It has been proposed heretofore to melt frost formed on cooling units of absorption refrigeration systems of the inert gas type by flowing a hot working fluid in the system, such as refrigerant vapor or absorption liquid, to the cooling units. In order to employ heated absorption liquid for defrosting, the liquid is raised by vapor-liquid lift action from the absorption liquid circuit from one level to a higher level for gravity flow through the cooling unit. When hot refrigerant vapor is employed for defrosting, a liquid trap is usually provided which blocks off the path of flow of hot vapor to the cooling unit, the liquid being removed from the trap to start defrosting.

Although the arrangements heretofore proposed have been effective for melting frost on cooling units, they have not been completely satisfactory because the cooling units often are heated to an unduly high temperature over which there has been no positive control. When hot refrigerant vapor is employed for defrosting, for example, the traps often are arranged to block flow of hot refrigerant vapor therethrough by accumulating liquid formed by condensation of vapor within the refrigeration system, and there has been no positive control over the rate at which the liquid is returned to the trap. Sealing of the trap with hot liquid in the system is unsatisfactory because hot vapors from the blocking liquid are always free to pass by diffusion to the cooling unit during normal operation of the refrigeration system, which is objectionable.

It is an object of my invention to provide, in an absorption refrigeration system of the inert gas type in which hot refrigerant vapor flows to a cooling unit to melt frost formed thereon, an improvement for positively controlling the flow of the hot vapor by quickly removing liquid from and supplying liquid to a trap which blocks the flow of the hot vapor to the cooling unit when the trap is filled with liquid.

Another object is to provide an improvement for removing from and supplying to the trap liquid which is at a lower temperature than that of the hot refrigerant vapor and of the absorption liquid at the region at which refrigerant vapor is expelled from solution.

A further object is to provide an improvement to effect removal of liquid from the trap by raising absorption liquid in the system from one level to a higher level by vapor-liquid lift action, and separating the raised liquid from the lifting vapor and conducting the liquid to the absorber to throttle and reduce circulation of inert gas therein and promote defrosting of the cooling unit.

A still further object is to raise the absorption liquid from the one level to the higher level by heat derived from an electrical heating element controlled by a switch having a thermal sensitive member in heat conductive relation with the cooling unit.

A still further object is to provide, in an absorption refrigeration system operated by a gas burner and having a thermostatic control provided with a thermal member affected by the temperature of the air cooled by the cooling unit, an improvement for heating the thermal member whenever the electrical heating element is energized to raise absorption liquid from the one level to the higher level whereby the supply of fuel to the gas burner will not be reduced during defrosting and a desired circulation of absorption liquid in its circuit will be effected to promote defrosting.

A still further object is to provide, in an absorption refrigeration system in which air for cooling a compartment is circulated by forced draft over the cooling unit by a motor-driven fan, an improvement for controlling the supply of electrical energy to the fan motor whereby the fan stops operating within a controlled interval of time after removal of liquid from the trap and starts operating again within a controlled interval of time after liquid has been supplied to the trap to block the flow of hot refrigerant vapor therethrough.

The above and other objects and advantages of the invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawing, in which.

Figure 1:
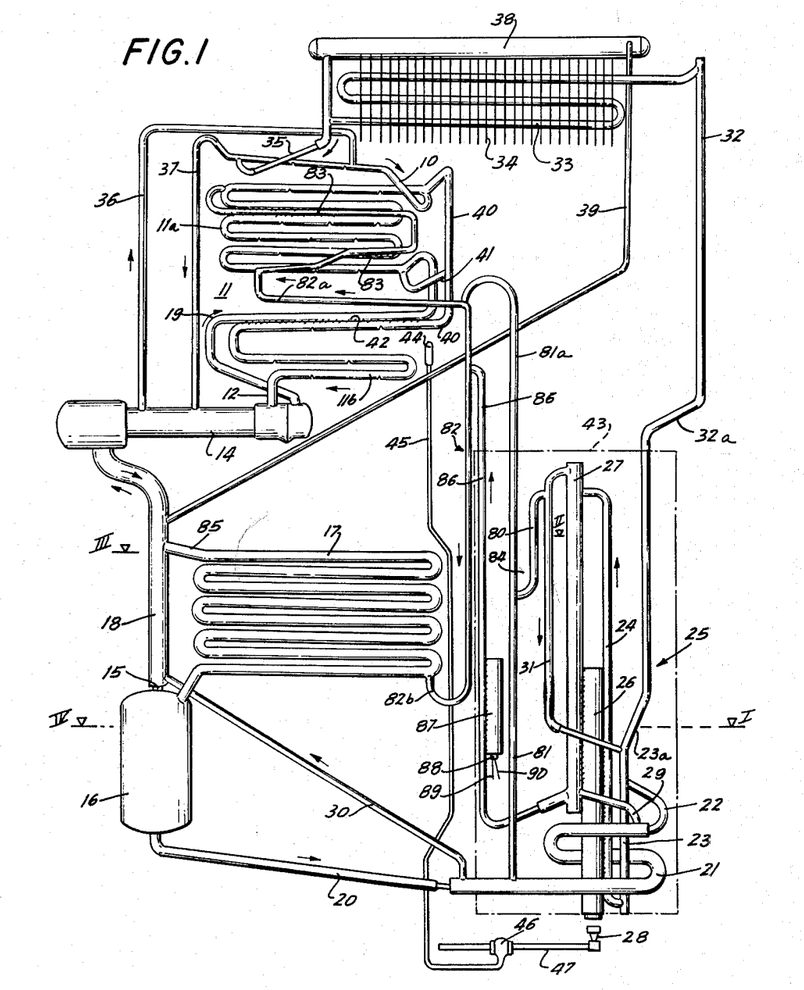
FIG. 1 illustrates more or less diagrammatically an absorption refrigeration system of the inert gas type embodying my invention.

Referring to FIG. 1, the invention is embodied in an absorption refrigeration system of a uniform pressure type in which an inert gas or auxiliary pressure equalizing agent is employed. In a system of this type a refrigerant fluid, such as liquid ammonia, for example, is introduced through a conduit 10 into an evaporator or cooling structure 11. The refrigerant fluid evaporates and diffuses in cooling structure 11 into an inert gas, such as hydrogen, for example, to produce a refrigerating effect. The resulting gas mixture of refrigerant and inert gas flows from the cooling structure 11 through a conduit 12, outer passage of gas heat exchanger 14, vertical conduit 15 and absorber vessel 16 to an absorber coil 17. In the absorber coil 17 refrigerant vapor is absorbed by a suitable absorbent, such as water, for example, which is introduced into coil 17 through a conduit 18. The hydrogen or inert gas, which is practically insoluble and weak in refrigerant, is returned to the cooling structure 11 through an upper part of the conduit 18, inner passage of gas heat exchanger 14 and a conduit 19. Natural circulation of gas in the gas circuit just described is due to the difference in specific weight of the columns of gas rich and weak, respectively, in refrigerant vapor. Since the column of gas rich in refrigerant vapor and flowing from cooling structure 11 to the absorber coil 17 is heavier than the gas weak in refrigerant vapor and flowing from such coil to the cooling structure 11, a force is produced or developed within the system for causing circulation of inert gas in the manner described.

From the vessel 16 enriched absorption liquid flows through a conduit 20, an inner passage of a liquid heat exchanger 21, a connection 22 and a vertical conduit 23 into the lower end of a vapor lift tube 24 of a generator unit 25. The generator unit comprises a heating tube 26 having the vapor lift tube 24 and a boiler pipe 27 in thermal exchange relation therewith, as by welding, for example. By heating generator unit 25, as by a gas burner 28, for example, liquid from conduit 23 is raised by vapor lift action through tube 24 into the upper part of the boiler pipe 27. The weakened absorption solution, from which refrigerant has been expelled in the boiler pipe 27, is conducted therefrom through a conduit 29, the outer passage of liquid heat exchanger 21, conduit 30 and conduit 18 which is disposed about the vertical conduit 15. Circulation of absorption solution in the manner just described is due to raising of liquid through the tube 24 from one level I to a higher level II in the standpipe 27. Absorption liquid flows downward by gravity from the level II in the standpipe 27 and flows from the upper end of conduit 18 at the level III into the upper end of the absorber coil 17.

The liberated lifting vapor entering boiler pipe 27 through the tube 24, and also vapor expelled from solution in the boiler pipe 27, flows through a conduit 31 which is connected at its lower end to conduit 23 below the liquid level I therein, the liquid level I in conduit 23 being essentially the same as the liquid level IV in the absorber vessel 16. With this arrangement the upper part of the liquid column in the conduit 23 forms an analyzer at 23a through which expelled vapor passes before entering a vapor line 32 connected at its upper end to an air-cooled condenser 33 provided with heat dissipating elements 34. The upper part of the vapor line 32 desirably is internally baffled (not shown) to form an air-cooled rectifier through which expelled vapor flows before being introduced into the condenser 33. Refrigerant vapor is liquefied in the condenser 33 and is returned to the cooling structure 11 through conduits 35 and 10.

Liquid refrigerant flowing to the evaporator structure 11 is precooled in conduit 10 by connecting spaced apart regions of this conduit by conduits 36 and 37 to the outer passage of the gas heat exchanger 14. Liquid refrigerant in the conduit 10 evaporates and diffuses into rich gas, thereby taking up heat from the liquid refrigerant. Natural circulation of a part of the rich gas is developed in a local circuit including the conduits 36 and 37 and a part of the conduit 10. A pressure vessel 38 may be connected in any well-known manner to the condenser 33 and to a part of the gas circuit. As shown, the pressure vessel 38 is connected by the upper part of conduit 35 to the outlet end of the condenser 33 and by a conduit 39 to the conduit 18.

The cooling structure 11 comprises two cooling coils 11a and 11b connected in series relation with inert gas from conduit 19 flowing upward through cooling coil 11a in the presence of and in counterflow to liquid refrigerant which is introduced through conduit 10. From the upper part of cooling coil 11a inert gas then passes through a conduit 40 for downward flow in the lower cooling coil 11a. Unevaporated liquid refrigerant from the lower part of cooling coil 11a passes through a connection 41 into conduit 40 and flows downward in cooling coil 11b in the presence of and in parallel flow with the inert gas. As seen in FIG. 1, conduits 19 and 40 are conductively connected to one another at 42 to precool inert gas in conduit 19 before it is introduced into the lower part of cooling coil 11a.

With inert gas flowing successively through the cooling coils 11a and 11b, the gas in the upper coil 11a contains a lesser amount of refrigerant vapor than the gas in the lower coil 11b. The partial vapor pressure of the refrigerant is a gradient, so that the temperature of liquid refrigerant in the cooling coils also is a gradient, the evaporating temperature of liquid being lower in upper cooling coil 11a than in the lower cooling coil 11b.

Figure 5:
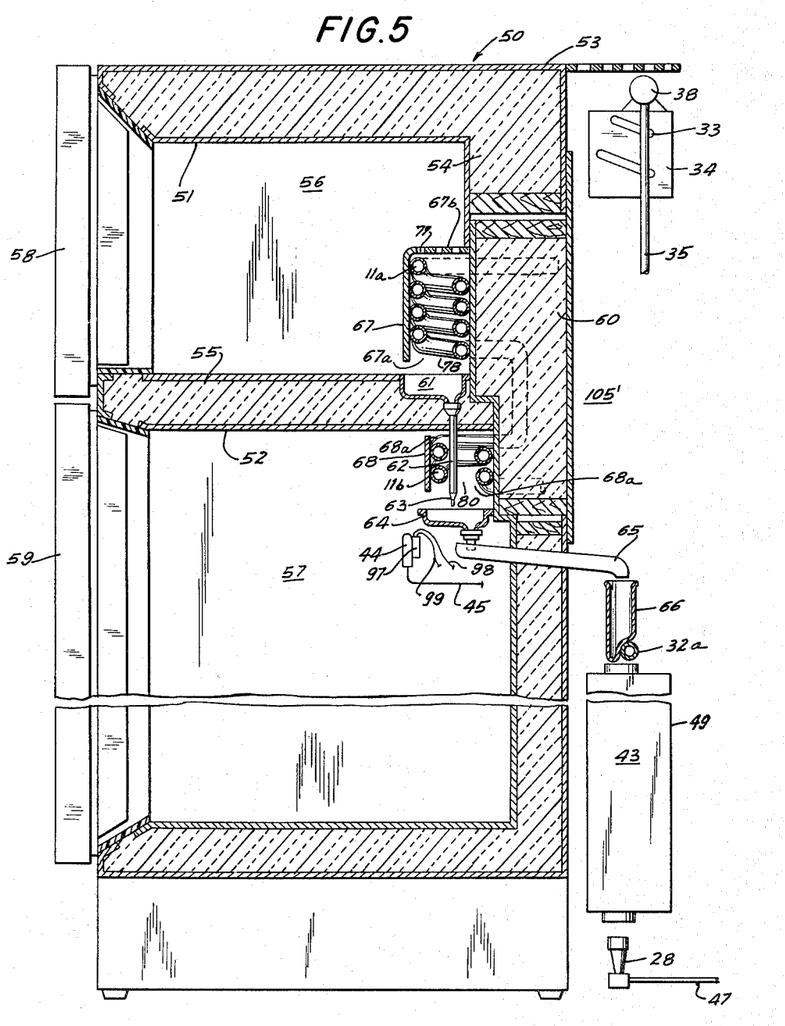
FIG. 5 is a side view, partly in section, of the refrigerator shown in FIG. 4.
Figure 8:
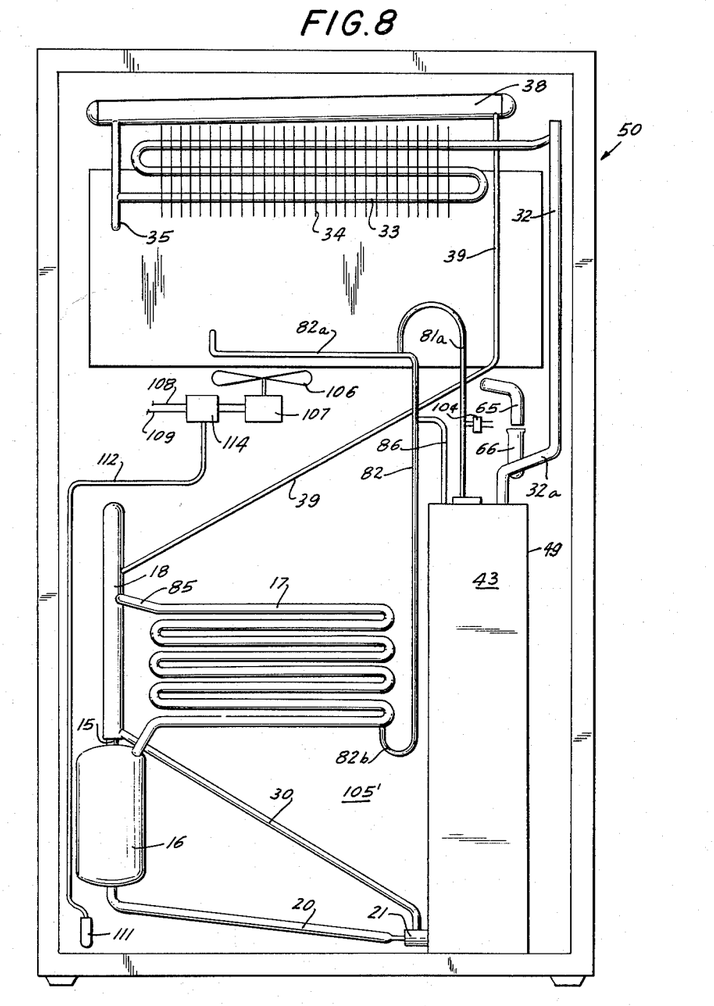
FIG. 8 is a rear elevation, partly broken away, of the refrigerator shown in FIGS. 4 and 5.

The generator unit 25 in its entirety, together with a major portion of the liquid heat exchanger 21, are embedded in a body of insulation material, diagrammatically illustrated at 43, which may be retained in a metal shell like that shown at 49 in FIGS. 5 and 8 having openings at the top and bottom thereof. The lower end of the heating tube 26, which projects through the bottom shell opening, may form part of a flue having an upper extension (not shown) which extends upward through the top shell opening. While the pipes and conduits of generator unit 25 have been diagrammatically illustrated alongside one another in FIG. 1, it will be understood that in practice the parts of the generator unit are arranged in a compact bundle about the heating tube 25 which desirably is embedded in the center region of the body of insulation 43.

A thermal bulb 44, which is arranged to be influenced by the temperature of air cooled by the higher temperature cooling coil 11b, as will be described hereinafter, is connected by a capillary tube 45 to a control device 46 which is connected in a fuel supply conduit 47 of the gas burner 28. In a manner well-known in the art, the thermal bulb 44 and tube 45 may form part of an expansible fluid thermostat which is charged with a suitable volatile fluid and responds to a temperature condition affected by cooling coil 11b to operate control device 46 to increase and decrease the supply of fuel to the burner 28 with increase and decrease, respectively, of the temperature of the air cooled by the cooling element 11b.

The thermostatic control just described is of the kind in which the supply of fuel desirably is not cut off completely and is reduced to such an extent that substantially no vapor is expelled from solution in the generator unit 25 when the air cooled by cooling coil 11b reaches a predetermined low temperature. Under these conditions, only a sufficient quantity of fuel is supplied to the burner 28 to maintain the latter ignited and only heat of liquid is supplied to the solution in the generator unit 25 at such times.

Figure 4:
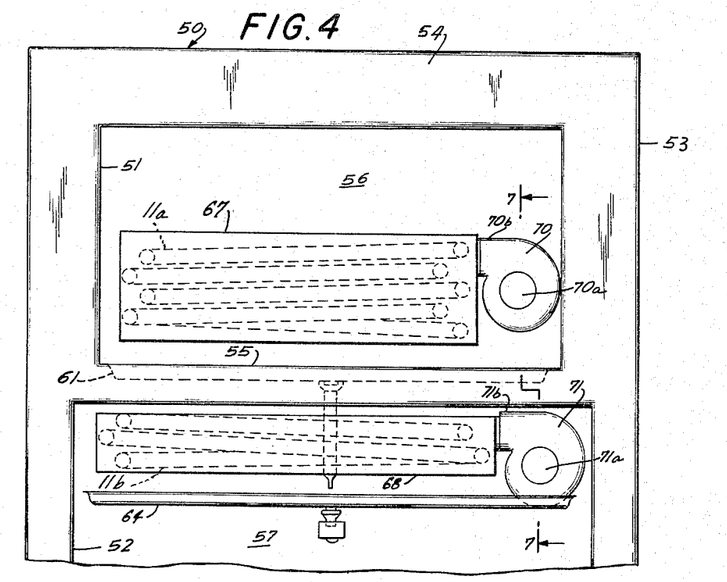
FIGURE 4 is a front elevation, partly broken away and in section, of a refrigerator in which the cooling elements of the absorption refrigeration system of FIG. 1 are embodied.

As shown in FIGS. 4 and 5, the cooling coils 11a and 11b are adapted to be positioned in the thermally insulated interior of a refrigerator comprising a cabinet 50 having inner shells 51 and 52 supported one above the other within an outer shell 53 and insulated therefrom and from one another with any suitable insulating material 54. The insulation and bottom and top walls of the inner shells 51 and 52, respectively, form a horizontal partition 55 which thermally segregates the top and bottom compartments 56 and 57 defined by the inner shells 51 and 52 respectively.

The top compartment 56 serves as a thermally insulated freezer space and the bottom compartment 57 as a space for storing foods at a higher temperature than in the top compartment 56 and preferably at a temperature above 32° F. Access to the top and bottom compartments 56 and 57 is afforded at front openings which are adapted to be closed by insulated doors 58 and 59 hinged in any suitable manner (not shown) at the front of the cabinet 50.

The top freezer space 56 is arranged to be cooled by the cooling coil 11a and the bottom food storage space is arranged to be cooled by the cooling coil 11b. Parts of the refrigeration system shown in FIG. 1 have been omitted and other parts, like the generator unit 25 and condenser 33, have only been shown schematically, a complete illustration of the manner in which the refrigeration system is mounted in the cabinet 50 not being necessary for an understanding of my invention.

The rear wall of the cabinet 50 is formed with an opening through which the cooling coils 11a and 11b are inserted into the interior of the cabinet 50, such opening being closed by an insulated closure member 60 removably secured to the cabinet in any suitable manner and through which extend the conduits (not shown) connecting the cooling coils 11a and 11b and other parts of the refrigeration system positioned at the rear of the cabinet 50.

A drain pan 61 is provided in the bottom of the inner liner 51 below the cooling coil 11a for collecting water dripping therefrom during defrosting. The water drains from pan 61 through a tube 62 having a flattened lower end 63 disposed above a second drain pan 64 mounted in any suitable manner below the cooling coil 11b. Water in pan 64 flows therefrom by gravity through a conduit 65 extending through the rear wall of the cabinet 50 and is discharged into a pan or collecting vessel 66 in good heat conductive relation with a heated conduit of the refrigeration system, such as the portion 32a of the vapor line 32 in FIG. 1. With this arrangement, water collected in vessel 66 during defrosting is effectively evaporated.

The flattened lower end 63 of tube 62, which is normally closed to seal the top and bottom compartments 56 and 57 from one another, may be formed of soft resilient material like rubber, for example, which yields to the force developed by the liquid column in the tube whereby the lower end 63 of the drain tube opens to allow water to pass therethrough during periods when defrosting is being effected and the temperature at the immediate vicinity of the drain tube is above 32° F. If desired, a heating member (not shown) may be provided at the vicinity of the drain tube 62 which can be rendered operable during defrosting to make certain that ice formed in the tube will melt and allow melted frost to drain therethrough.

The cooling coils 11a and 11b are concealed from view by the front and spaced end walls of three-sided casings 67, 68. The three-sided casings 67 and 68, together with the rear walls of the inner shells 51 and 52, define vertically extending passages 67a, 68a in which the cooling coils 11a and 11b are disposed.

Figure 7:
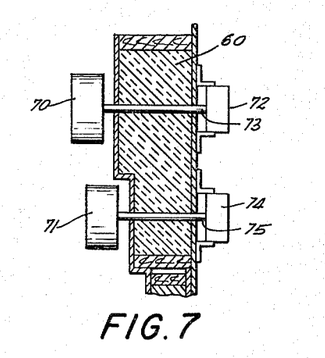
FIG. 7 is a fragmentary sectional view taken at line 7—7 of FIG. 4.

Suitable fans 70, 71 having air inlets 70a, 71a and air outlets 70b, 71b are provided for circulating air in the compartments 56 and 57 by forced draft. The fans 70, 71 are disposed in the rear of the compartments 56, 57 and are arranged to be driven by electric motors which may be located at the rear of the cabinet 50. As seen in FIG. 7, an electric motor 72 is connected by a shaft 73 to drive the fan 70, and an electric motor 74 is connected by a shaft 75 to drive the fan 71, both motors being mounted in any suitable manner to the rear wall of the closure member 60 outside the cabinet 50.

Figure 6:
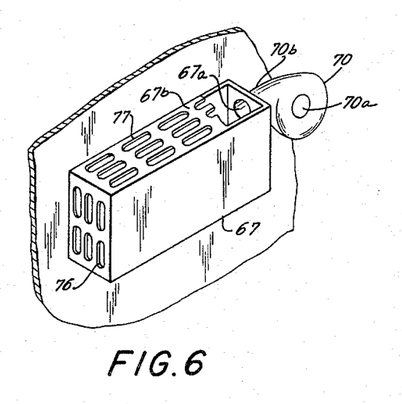
FIG. 6 is a fragmentary perspective view of details shown in FIGS. 4 and 5.

Referring to FIGS. 4 and 6, the air outlets 70b, 71b of the fans 70, 71 are connected to the casing end walls in communication with openings therein, one of which is shown in FIG. 6 at 67a. The end walls adjacent to the fans are imperforate except for the openings to which the fan air outlets 70b, 71b are connected. The casing front walls are imperforate whereas the end walls removed from the fans 70, 71 are provided with elongated slots, as seen at 76 in FIG. 6. The casing 67 is also provided with a top wall 67b having elongated slots 77. The casing 67 is open at the bottom at 78, and the passageway 68a of casing 68 is open at both the top and bottom.

When the fans 70, 71 are being operated, air in the compartments 56, 57 is drawn into the fan inlets 70a, 71a and discharged at a higher pressure from the fan outlets 70b, 71b into the casings 67, 68. The air introduced at a relatively high velocity into the casings 67, 68 flows horizontally across the compartments 56, 57 in thermal relation with the cooling coils 11a and 11b. Cool air is discharged from the casing 67 through the openings 76 in one end wall, openings 77 in top wall 67b, and from the bottom opening 78. Cool air is discharged from the casing 68 through openings in one end wall and from the top and bottom open ends of the passageway 68a.

Frost accumulates on the cooling coils 11a and 11b during operation of the refrigeration system, such frost being formed by water vapor in the air condensing on the coils. If layers of frost of considerable thickness should be allowed to accumulate on the cooling coils, the efficiency of the refrigeration system would be reduced considerably. In order to effect defrosting of the cooling coils 11a and 11b, vapor expelled from the generator unit 25 and at an elevated temperature is conducted therefrom to cooling structure 11 in a path of flow which includes conduit 80 and portions 81a and 82a of conduits 81 and 82, respectively, as shown in FIG. 1. The conduit portion 82a may, if desired, be heat conductively connected at 83 to coil 11a, as by spot welding, for example.

When hot expelled vapor is introduced into the cooling structure 11, the partial pressure of the refrigerant vapor in the cooling structure will increase and the temperature of the cooling structure will rise above the freezing temperature of water. Accordingly, frost accumulated on the cooling structure 11 can be melted rapidly by hot vapor flowing thereto from the generator unit 25 in a path of flow which by-passes the condenser 33.

During normal operation of the refrigeration system, the flow of hot expelled vapor directly to the cooling structure 11 is blocked by liquid held in a U-trap 84 formed by the conduit 80 and upper portion 81a of conduit 81 whose lower end is connected to the outer passage of the liquid heat exchanger 21 at a low point of the absorption liquid circuit. It will be seen that the lower end of conduit 80 is connected to conduit 81 at a level which is below the level III at 85 at which weak absorption liquid is introduced into the upper end of the absorber coil 17 during normal operation of the refrigeration system.

In accordance with my invention, defrosting is started by withdrawing liquid from U-trap 84 with a second vapor lift tube or pump 86 to allow hot expelled vapor to by-pass the condenser 33 and flow directly into the cooling structure 11, and transferring the raised weak absorption liquid from the upper end of the second vapor lift pump 86 to the bottom part of the absorber coil 17 which contains absorption liquid enriched in refrigerant which is flowing toward the generator unit 25. The lifting vapor developed in the second vapor lift tube 86 is allowed to flow to the evaporator structure 11, such lifting vapor being separated from the raised weak absorption liquid and mixing with hot expelled vapor which passes through U-trap 84 after liquid has been withdrawn therefrom.

The lower end of the second vapor lift tube 86 is connected to the bottom of the generator standpipe 27 and receives heat from a heating tube 87 arranged to be heated by an electrical heating element 88 therein which is connected by conductors 89 and 90 to a source of electrical energy. The upper end of the second vapor lift tube 86 is connected to conduit 82 at a point which is above the liquid level II in the standpipe 27 and below the level at which the upper portion 81a of conduit 81 is connected thereto. The lower end of conduit 82, which is formed with a liquid trap 82b, is connected to the bottom part of the absorber coil 17. The weak absorption liquid raised in the second vapor lift tube 86 is separated from the lifting vapor when it is introduced into the conduit 82 and flows downward in the latter and mixes with rich absorption liquid flowing from the absorber coil. On the other hand, the lifting vapor passing from the upper end of the second vapor lift tube 86 into the upper portion 82a of conduit 82 mixes with hot expelled vapor developed in the generator unit 25 and entering the conduit portion 82a through the upper portion 81a of the conduit 81. It will now be understood that the second vapor lift tube 86 functions to lower the liquid level in the standpipe 27 from the liquid level II, which is above the liquid level III at which absorption liquid is introduced into the absorber coil 17 at 85, and also to lower the liquid levels in conduits 80 and 81 below the point at which these conduits are connected, so that hot expelled vapor can flow from the vapor space in the upper part of the standpipe 27 through conduit 80 into the conduit portion 81a of conduit 81. By withdrawing liquid from the lower end of the standpipe 27 through the second vapor lift tube 86 which is connected thereto, liquid is transferred from that part of the absorption liquid circuit having the highest liquid surface level to the bottom part of the absorber coil 17 adjacent to the vessel 16 having the lowest level in the liquid circuit.

When absorption liquid in the generator standpipe 27, which is at an elevated temperature, is employed as the blocking liquid in a U-trap like the U-trap 84, small quantities of vapor pass by diffusion from the liquid surface of the blocking liquid to the cooling structure even during normal operation of the refrigeration system, which is objectionable. The blocking liquid in U-trap 84 is relatively cool for the reason that the lower end of conduit 81 is connected to the discharge end of the outer passage of the liquid heat exchanger 21 to receive weak absorption liquid from the standpipe 27 after it has given up considerable quantities of heat to rich absorption lliquid flowing in thermal relation therewith to the generator unit 25.

Since the weak absorption liquid raised in the second vapor lift tube 86 is not returned directly to the generator unit 25 for recirculation therethrough, but, instead, is conducted to the extreme bottom part of the absorber coil 17, several advantages accrue. First, the weak absorption liquid entering the bottom part of the absorber coil 17 through conduit 82 throttles and blocks the flow of inert gas in its normal upward path of flow through the absorber coil. In this way the normal circulation of inert gas through and between the cooling structure 11 and the absorber coil 17 is materially reduced, and rapid defrosting of the cooling structure is promoted when hot expulsion vapor from the standpipe 27 is introduced into the cooling structure. Second, the weak absorption liquid entering the bottom of the absorber coil 17 from the conduit 82 mixes with a relatively large quantity of absorption liquid in the absorber vessel 16 which is enriched in refrigerant. With this arrangement all of the absorption liquid flowing to the generator unit 25 will be enriched with refrigerant to such an extent that, when a defrosting period ends, the normal operation of the refrigeration system will be quietly resumed and the conditions existing when defrosting stops will not adversely affect resumption of the normal operation of the system, which would be the case if the raised weak absorption liquid were to be returned directly to the generator unit 25 from the conduit 82.

Figure 2:
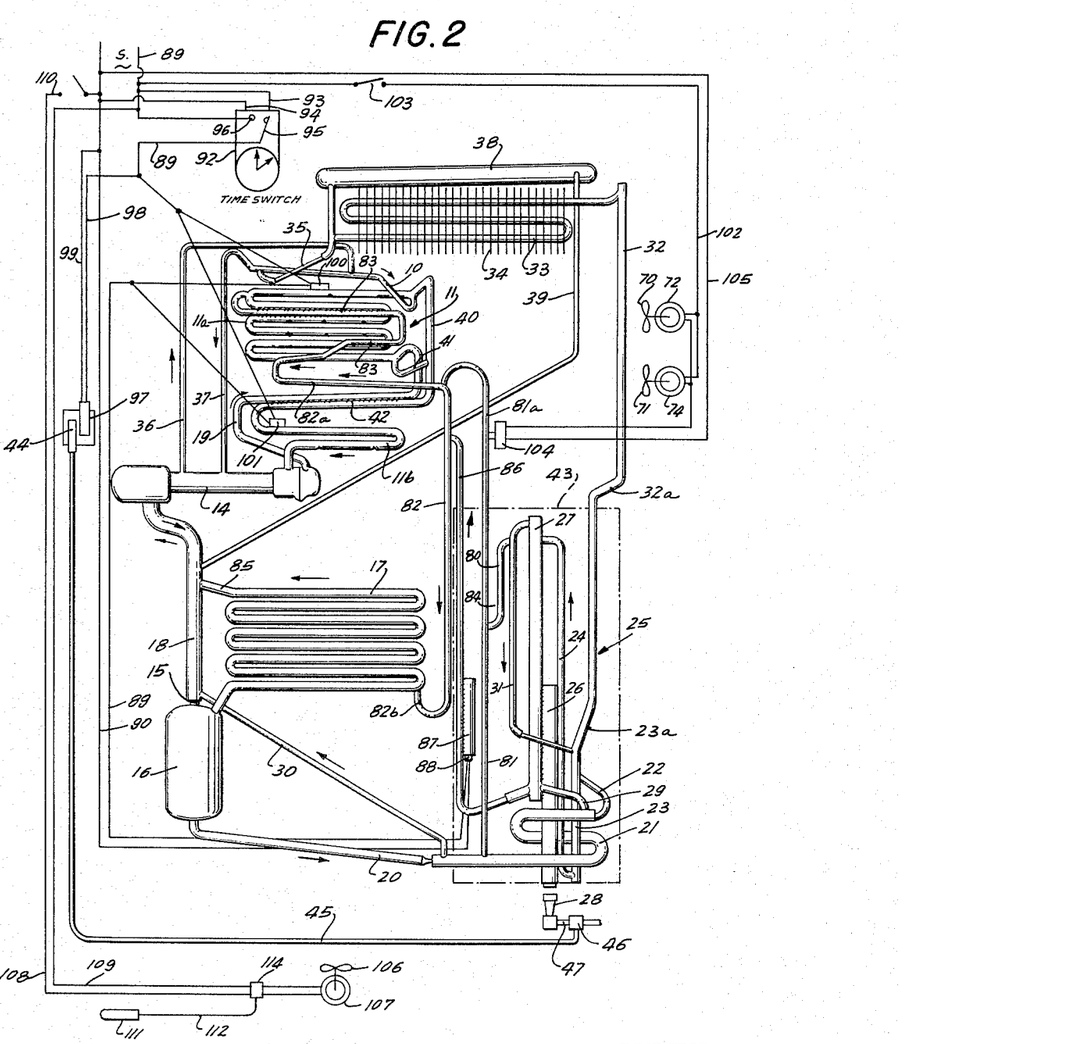
FIG. 2 schematically illustrates a control arrangement applied to the absorption refrigeration system of FIG. 1.
Figure 3:
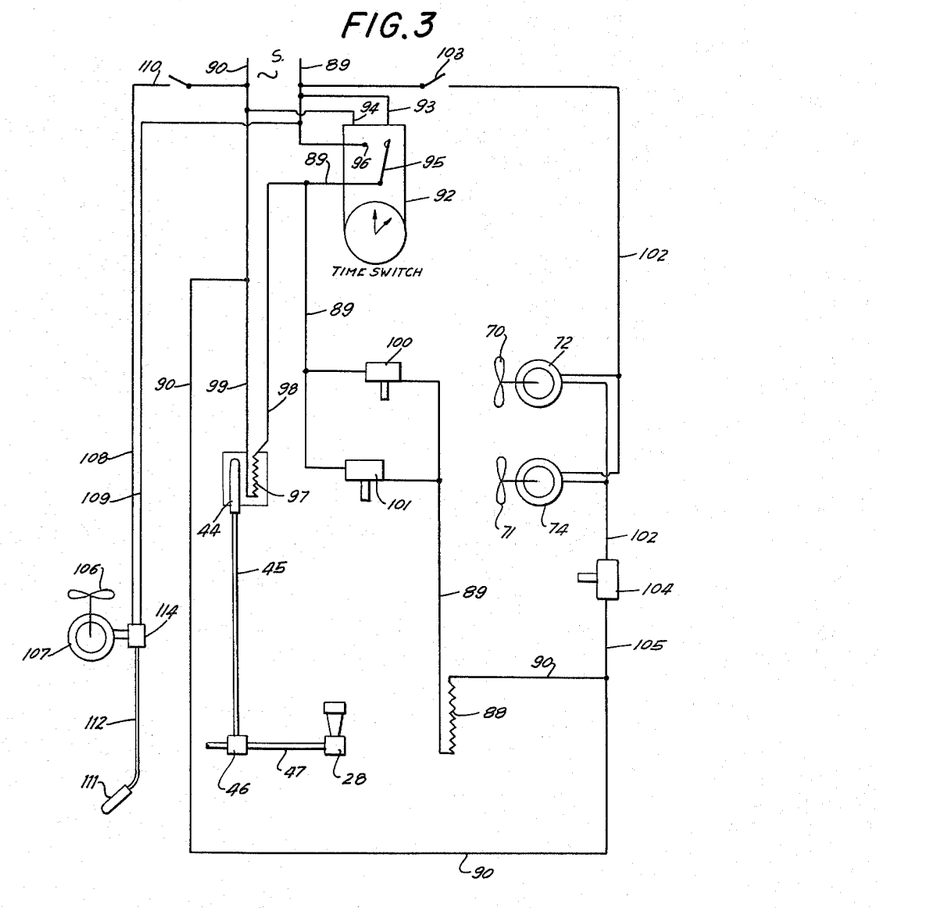
FIG. 3 schematically illustrates the control arrangement of FIG. 2 apart from the absorption refrigeration system.

In FIGS. 2 and 3 I have schematically illustrated a control arrangement for controlling the refrigeration system of FIG. 1, the control arrangement being shown in the two figures with and apart from the refrigeration system, respectively. As shown in FIGS. 2 and 3, the electrical heating element 88 for the second vapor lift tube 86 is connected by the conductors 89 and 90 to a source of electrical energy. In order to energize the heating element 88 at pre-set intervals of time, an electric time switch 92 is connected in the conductor 89. The time switch 92, in which is electrically driven and connected across the conductors 89 and 90 by conductors 93 and 94, functions as a relay and moves contact arm 95 into engagement with contact 96 for set periods of time at spaced intervals whereby heating element 88 is energized intermittently.

It has been explained above that thermal bulb 44 is influenced by the temperature of the air in the food storage compartment 57, as shown in FIG. 5. To make certain that the normal supply of fuel to the burner 28 will not be shut off when a defrosting period starts, which would be the case if the temperature of the air in storage compartment 57 were sufficiently low, an electrical heating element 97 is arranged in thermal relation with the bulb 44 and energized whenever heating element 88 is energized. Accordingly, heating element 97 is connected across conductors 89 and 90 by conductors 98 and 99, the time switch 92 in conductor 89 being interposed between the source of electrical energy S and the point where conductor 98 is connected to conductor 89. Essentially, the heating elements 88 and 97 are connected in parallel and both are energized when contact arm 95 and contact 96 are engaged. With this arrangement the thermostat bulb 44 will always function to maintain a normal supply of fuel to the burner 28 and insure that hot expelled vapor will be produced in the generator unit 25 when a defrosting period starts.

The length of the defrosting periods is governed by a pair of bimetallic thermostats 100 and 101, one of which is in thermal relation with cooling coil 11a and the other in thermal relation with cooling coil 11b. In FIGS. 2 and 3, the bimetallic thermostats 100 and 101 are connected in parallel in conductor 89 between the heating element 88 and the time switch 92. When the temperatures of the cooling coils 11a and 11b reach the temperatures for which the bimetallic thermostats 100 and 101 are adjusted, which determines the time when the supply of hot expelled vapor from the generator unit 25 to the evaporator structure 11 should stop, the bimetallic thermostats 100 and 101 open and disconnect the heating element 88 from the source of electrical energy S. The time switch 92 desirably is adjusted so that the bimetallic thermostats 100 and 101 normally control the exact moment for heating element 88 to become deenergized, and the time switch 92 subsequently functions to separate contact arm 95 from contact 96. With this arrangement the time switch 92 exercises control over the heating element 88 at the end of a defrosting period only if the bimetallic thermostats 100 and 101 fail to operate properly. If desired, a single bimetallic thermostat, arranged in thermal relation with the cooling structure 11, may be connected in conductor 89 in place of the bimetallic thermostats 100 and 101 connected in parallel in this conductor.

It is also desirable to stop and start the fans 70 and 71 at the correct times at the beginning and end, respectively, of the defrosting periods. As shown in FIGS. 2 and 3, the fan motors 72 and 74 are connected in parallel in a conductor 102 having a manually operable switch 103. A bi-metallic thermostat 104, which is arranged in thermal relation with the upper portion 81a of conduit 81, is connected by conductors 102 and 105 across the conductors 89 and 90. It will be seen that conductor 102 is connected to conductor 89 at a region between the source of electrical energy S and the time switch 92, and hence the fan motors 72 and 74 will not be affected by the operation of the time switch.

The function of the bimetallic thermostat 104 will now be explained. During normal operation of the refrigeration system, the air in the freezing and food storage compartments 56 and 57 may be maintained at −18° C. and +3° C., respectively. Under these conditions, frost will accumulate on the coils 11a and 11b and they will require defrosting at spaced intervals of time. In order for this to be accomplished, the temperatures of the cooling coils will have to be increased from their normal operating temperatures of about −22° C. and −5° C. to a temperature of about 0° C. If the fans 70, 71 should be allowed to operate while the temperatures of the cooling coils 11a and 11b are increasing during the defrosting periods, the heat supplied to the evaporator coils 11a and 11b would be made available to air throughout the compartments 56, 57 due to forced draft circulation of the air induced by the fans, which would be objectionable. Therefore, the operation of the fans 70, 71 is stopped after the air temperature in each of the compartments 56, 57 has increased from about 5° to 10° C. above their normal operating temperatures. By allowing the fans 70, 71 to operate for a short interval of time after a defrosting period has started, the refrigerating effect produced by the coils 11a and 11b is advantageously utilized to maintain the average air temperatures in the compartments 56, 57 at a lower value than they would be if the operation of the fans 70, 71 were to be stopped at the very beginning of a defrosting period.

When defrosting of the cooling coils 11a and 11b has been completed, it is desirable not to start operation of the fans 70, 71 until the refrigeration system has been operating for a sufficient length of time for the temperatures of the cooling coils 11a and 11b to be reduced to temperatures approaching their normal operating temperatures.

In order that the fans 70, 71 will stop and start operating at the correct times at the begnning and end of a defrosting period in the manner just explained, the bimetallic thermostat 104 is arranged in thermal relation with the conduit portion 81a of conduit 81 through which hot expelled generator vapor flows after the blocking liquid is removed from the U-trap 84. The bimetallic thermostat 104 may be adjusted to open the circuit for the fan motors 72, 74 when the conduit portion 82a becomes heated to about 120° C., a temperature that is reached only a few minutes after the time switch 92 has become operative to complete the circuit for the electrical heating elements 88 and 97 and start a defrosting period.

When the bimetallic thermostats 100 and 101 become effective to open the circuit for heating element 88 and stop the operation of the second vapor lift tube 86, liquid will rapidly flow into the U-trap 84 to block the flow of hot generator vapor from the vapor space in the top part of the standpipe 27 to the cooling structure 11. While the flow of hot expelled vapor through the conduit portion 81a is quickly stopped when a defrosting period is terminated, its temperature still drops relatively slowly. I have found that under these conditions it is desirable for the bimetallic thermostat 104 to be adjusted to close and complete the circuit for the fan motors 72, 74 when the condit portion 81a is at a temperature of about 100° C.

It will be understood that the particular temperatures at which the bimetallic thermostat 104 can be adjusted to close and open the circuit for the fan motors 72, 74 are given only by way of example and may be varied to stop and start the fans 70, 71 at the most desirable times in each given situation. The precise time when the bimetallic thermostat 104 becomes operable to open and close the circuit for the fan motors 72, 74 may be regulated and controlled in any suitable manner. For example, the extent of the thermal relation of the bimetallic thermostat with the conduit portion 81a may be decreased or increased by bodily shifting the position of the thermostat or by interposing between the conduit portion 81a and the thermostat a material having poor heat conductivity.

The heat rejecting parts of the refrigeration system are positioned in the rear of the cabinet 50 in a vertically extending apparatus space 105' which is exterior of the thermally insulated compartments 56 and 57 and open at the top and bottom, as best seen in FIG. 8. These heat rejecting parts include the absorber coil 17 and condenser 33. Natural draft is produced in the space 105' and causes an upward circulation of ambient air due to heat radiated by the absorber coil 17 and condenser 33, so that surrounding cooler air can flow directly over their surfaces and assure adequate cooling of these parts of the refrigeration system. When the temperature of the cooling ambient air introduced into the space 105' exceeds a predetermined value, such as +35° C., for example, it may be desirable to supplement natural draft circulation of ambient air in the apparatus space by forced draft circulation. As shown in FIG. 8, this may be accomplished by locating a fan 106 in the space 105' at a level between the absorber coil 17 and condenser 33. The fan 106 is driven by an electric motor 107 mounted at the rear wall of the cabinet 50 in any suitable manner. Suitable baffles (not shown) may be provided in the space to distribute air flowing therethrough over all parts of the absorber coil 17 and condenser 33. As shown in FIG. 3, the motor 107 is connected by conductors 108 and 109 to the source of electrical energy S, a switch 110 being provided in conductor 108.

The operation of the fan motor 107 may be controlled by a thermal bulb 111 which is positioned in the bottom part of the apparatus space 105' and forms part of a capillary thermostat including a capillary tube 112 which is connected to a control device 114 provided in the conductors 108, 109. It will be understood that natural draft circulation of air is produced in the space when the surrounding cooler air is below a definite temperature, and that the thermal bulb 111 will function to complete the circuit for the motor 107 to drive the fan 106 to augment the natural draft air circulation when the temperature of the surrounding air exceeds the definite temperature.

Modifications of the embodiment of the invention I have illustrated and described will occur to those skilled in the art, and I intend in the claims to cover all those modifications which do not depart from the spirit and scope of my invention.

I claim:

1. A refrigeration system having a circuit for circulation of absorption solution including an absorber and a high temperature place of heating where vaporous fluid is expelled from solution to maintain a supply of such fluid, a condenser and a cooling element, means including said condenser providing a first path of flow of fluid from said place of heating to said cooling element, a gas circuit including said cooling element and said absorber for circulating gas therein by a force developed by the difference in specific weight of columns of gaseous fluid, a by-pass connection around said condenser providing a second path of flow for vaporous fluid from said place of heating to said cooling element, said by-pass connection including a trap, means to supply liquid to said trap to block flow of vaporous fluid therethrough, means for removing liquid from said trap including a tube for withdrawing absorption solution from said circuit at one level and raising the withdrawn solution to a higher level by vapor-liquid lift action, and means for separating the raised solution and lifting vapor passing from the upper end of said tube and conducting the raised solution to said absorber to reduce the force developed in the gas circuit for circulating gas therein.

2. A refrigeration system having a circuit for circulation of absorption solution including an absorber and a high temperature place of heating where vaporous fluid is expelled from solution to maintain a supply of such fluid, a condenser and a cooling element, means including said condenser providing a first path of flow of fluid from said place of heating to said cooling element, a gas circuit including said cooling element and said absorber for circulating gas therein by a force developed by the difference in specific weight of columns of gaseous fluid, a by-pass connection around said condenser providing a second path of flow for vaporous fluid from said place of heating to said cooling element, said by-pass connection including a trap connected to receive absorption solution in said circuit to block flow of vaporous fluid therethrough, means including a tube for withdrawing absorption solution from said circuit at one level and raising the withdrawn solution to a higher level by vapor-liquid lift action, means for separating the raised solution and lifting vapor passing from the upper end of said tube and conducting the separated vapor to said gas circuit and conducting the raised solution to said absorber to reduce the force developed in the gas circuit for circulating gas therein, and means responsive to raising of solution in said tube for removing absorption solution from said trap to open said by-pass connection.

3. A refrigeration system having a circuit for circulation of absorption solution including an absorber and a high temperature place of heating where vaporous fluid is expelled from solution to maintain a supply of such fluid, said circuit including first conduit means for conducting absorption solution from said absorber to said place of heating and second conduit means in thermal relation with said first conduit means for conducting absorption solution from said place of heating to said absorber, a condenser and a circuit for circulation of inert gas including a cooling element and said absorber, means including said condenser providing a first path of flow of fluid from said place of heating to said cooling element, a by-pass connection around said condenser providing a second path of flow for vaporous fluid from said place of heating to said cooling element, said by-pass connection including a trap connected to receive from said second conduit means absorption solution, after flowing in thermal relation with solution in said first conduit means, to block flow of vaporous fluid therethrough, means including a tube for withdrawing absorption solution from said circuit at one level and raising the withdrawn solution to a higher level by vapor-liquid lift action, means for separating the raised solution and lifting vapor passing from the upper end of said tube and conducting the separated vapor to said gas circuit and conducting the raised solution to said absorption solution circuit, and means responsive to raising of solution in said tube for removing absorption solution from said trap to open said by-pass connection.

4. A refrigeration system having a circuit for circulation of absorption solution including a high temperature place of heating where vaporous fluid is expelled from solution to maintain a supply of such fluid, a condenser and a cooling element, means including said condenser providing a first path of flow of fluid from said place of heating to said cooling element, a by-pass connection around said condenser providing a second path of flow for vaporous fluid from said place of heating to said cooling element, said by-pass connection including a trap connected to receive absorption solution in said circuit to block flow of vaporous fluid therethrough, means including a tube for withdrawing absorption solution from said circuit at one level and raising the withdrawn solution to a higher level by vapor-liquid lift action, means for separating the raised solution and lifting vapor passing from the upper end of said tube and introducing the separated vapor to a region of said connection between said trap and said cooling element for flow to said cooling element and conducting the raised solution to said absorption solution circuit, and means responsive to raising of solution in said tube for removing absorption solution from said trap to open said by-pass connection.

5. A refrigerator comprising a cabinet having a thermally insulated compartment, a refrigeration system having a plurality of parts including a circuit for circulation of absorption solution including an absorber and a high temperature place of heating where vaporous fluid is expelled from solution to maintain a supply of such fluid, means including a first heater for supplying heat to said place of heating to expel vaporous fluid from solution, a condenser and a cooling element arranged to abstract heat from said compartment, said cooling element being subject to formation of frost thereon, means including said condenser providing a first path of flow of fluid from said place of heating to said cooling element, a gas circuit including said cooling element and said absorber for circulating gas therein by a force developed by the difference in specific weight of columns of gaseous fluid, a by-pass connection around said condenser providing a second path of flow for vaporous fluid from said place of heating to said cooling element to increase the temperature of said cooling element sufficiently to melt frost thereon, said by-pass connection including a trap connected to receive absorption solution in said circuit to block flow of vaporous fluid therethrough, means for removing solution from said trap including a tube and a second heater therefor for withdrawing absorption solution from said circuit at one level and raising the withdrawn solution to a higher level by vapor-liquid lift action, and means for separating the raised solution and lifting vapor passing from the upper end of said tube and conducting the separated vapor to said gas circuit and conducting the raised solution to said absorber to throttle and reduce the force developed in the gas circuit for circulating gas therein.

6. A refrigerator as set forth in claim 5 comprising means including a fan for circulating air over said cooling element, said fan having an inlet and outlet in communication with said compartment for inducing circulation of cool air therein by forced draft, an electric motor for driving said fan, means including an electric circuit for connecting said motor to a source of electrical energy, switch means in said circuit having a thermal sensitive member associated therewith which is in thermal relation with a part of the refrigeration system whose temperature changes responsive to change of operation of the refrigeration system from normal operation to defrosting and vice versa, said switch means being so constructed and arranged that said switch means opens said fan motor circuit within a controlled interval of time after removal of solution from said trap when defrosting of said cooling element is started and said switch means closes said fan motor circuit within a controlled interval of time after said trap receives solution to close said by-pass connection.

7. A refrigerator as set forth in claim 6 in which said thermal sensitive member is in thermal relation with said by-pass connection at a region between said trap and said cooling element.

8. A refrigerator comprising a cabinet having thermally insulated low and higher temperature compartments, a refrigeration system having a circuit for circulation of absorption solution including an absorber and a high temperature place of heating where vaporous fluid is expelled from solution to maintain a supply of such fluid, a condenser and cooling structure including low and higher temperature cooling elements arranged to abstract heat from the low and higher temperature compartments, respectively, means including said condenser providing a first path of flow of fluid from said place of heating to said cooling structure, a gas circuit including said cooling structure and said absorber, a by-pass connection around said condenser providing a second path of flow for vaporous fluid from said place of heating to said cooling structure, said by-pass connection including a trap connected to receive liquid in the system to block flow of vaporous fluid therethrough, means including a first heater for removing liquid from said trap whereby vaporous fluid will flow through said by-pass connection to effect defrosting of said cooling structure, heating means operable to supply heat at a first rate to said place of heating to expel vaporous fluid from solution during normal operation of the system when cooling is being effected by said cooling structure, control means including a thermostat affected by the temperature of said higher temperature cooling element for controlling said heating means to vary the heat supply to said place of heating in a range varying between the first rate and a lower rate, said thermostat including a thermal sensitive member out of physical contact with said higher temperature cooling element, and means including a second heater operable to heat the thermal sensitive member of said thermostat when operation of said first heater is initiated to cause said heating means to supply heat at the first rate to said place of heating, whereby said heating means always will be effective to expel vaporous fluid from solution at said place of heating when operation of said first heater is initiated to start defrosting of said cooling structure.

9. A refrigeration system having a circuit for circulation of absorption solution including an absorber and a high temperature place of heating where vaporous fluid is expelled from solution to maintain a supply of such fluid, a condenser and a cooling unit, means including said condenser providing a first path of flow of fluid from said place of heating to said cooling unit, a gas circuit including said cooling unit and said absorber, a by-pass connection around said condenser providing a second path of flow for vaporous fluid from said place of heating to said cooling unit, said by-pass connection including a trap, said trap being connected to receive liquid in the system to block flow of vaporous fluid therethrough, means including a first heater for removing liquid from said trap to open said by-pass connection and allow vaporous fluid to flow from said place of heating in said second path of flow to said cooling unit to effect defrosting of said unit, means including a second heater for heating said place of heating, control means responsive to a temperature condition affected by said cooling unit for controlling said second heater to regulate the heat supply to said place of heating and supply heat at a first rate during normal operation of the system when cooling is being effected by said cooling unit and flow of vaporous fluid through said by-pass connection is blocked by liquid in said trap, vaporous fluid being expelled from solution at said place of heating when heat is supplied thereto by said second heater at the first rate, a third heater, means for rendering said third heater operable when said first heater is rendered operable to remove liquid from said trap, and said control means also being responsive to a temperature condition affected by said third heater for controlling said second heater to supply heat to said place of heating at the first rate, whereby said second heater always will be effective to expel vaporous fluid from solution at said place of heating when said first heater is rendered operable to remove liquid from said trap and initiate defrosting of said cooling unit.

10. An air-cooled refrigerator comprising a cabinet having a thermally insulated compartment, a refrigeration system having a plurality of parts including a circuit for circulation of absorption solution including an absorber and a place of heating where vaporous fluid is expelled from solution to maintain a supply of such fluid, a cooling element arranged to abstract heat from said compartment, a condenser, means including said condenser providing a path of flow of fluid from said place of heating to said cooling element, and a gas circuit including said cooling element and said absorber for circulation of gas therethrough and therebetween, means including a heater for supplying heat to said place of heating, the rear of said cabinet having a vertically extending apparatus space which is exterior of said thermally insulated compartment and open at the top and bottom, said absorber and said condenser being disposed in said apparatus space, a fan in said space, an electric motor for driving said fan to circulate ambient air by forced draft in said space to effect cooling of said absorber and said condenser, an electrical circuit in which said motor is connected, and means including a thermostat for controlling said electrical circuit responsive to a temperature condition affected by the temperature of the ambient air to close said electrical circuit when the ambient air reaches a definite temperature and to open said electrical circuit when the ambient air falls below the definite temperature, said absorber and said condenser functioning to induce natural circulation of air in said space when said electrical circuit is opened by said control means and renders said fan motor inoperable.

11. An air-cooled refrigerator as set forth in claim 10 in which said absorber is positioned at one level and said condenser is positioned at a higher level in said apparatus space, and said fan is located in said apparatus space between said condenser and said absorber and arranged to circulate air upward in said space past said absorber and said condenser, respectively.

12. A refrigerator comprising a cabinet having a thermally insulated compartment, a refrigeration system comprising a plurality of parts including a cooling element in which evaporation of refrigerant is effected during normal operation of the system, said cooling element being subject to formation of frost thereon, means including an electrical heating element for defrosting said cooling element to remove frost formed thereon, said defrosting means further including parts of the refrigeration system which function to provide a path for flowing heated fluid to said cooling element, means for changing operation of the refrigerating system from normal operation to defrosting and vice versa, a fan for circulating air over said cooling element, said fan having an inlet and outlet in communication with said compartment for inducing circulation of cool air therein by forced draft, an electric motor for driving said fan, means including an electric circuit for connecting said motor to a source of electrical energy, and control means for controlling said electrical circuit, said control means being responsive to a temperature condition affected by at least one of said parts providing the path for flowing heated fluid to said cooling element for opening said electrical circuit to de-energize said fan motor when said defrosting means is rendered operable and for closing said electrical circuit to energize said fan motor when said defrosting means is rendered inoperable by said operation changing means and normal operation of the refrigeration system is effected.

13. A refrigerator as set forth in claim 12 in which said control means functions to close said electrical circuit to energize said fan motor within a controlled interval of time after said defrosting means is rendered operable by said operation changing means.

14. A refrigerator comprising a cabinet having a thermally insulated compartment, a refrigeration system comprising a plurality of parts including a cooling element in which evaporation of refrigerant is effected during normal operation of the system, said cooling element being subject to formation of frost thereon, means including an electrical heating element for defrosting said cooling element to remove frost formed thereon, said defrosting means further including parts of the refrigeration system which function to provide a path for flowing heated fluid to said cooling element, means for changing operation of the refrigeration system from normal operation to defrosting and vice versa, a fan for circulating air over said cooling element, said fan having an inlet and outlet in communication with said compartment for inducing circulation of cool air therein by forced draft, an electric motor for driving said fan, means including electrical circuits for connecting said motor and said heating element to a source of electrical energy, said operation changing means including switch means in said heating element circuit to close and open the latter to instigate and terminate defrosting, respectively, timing mechanism for actuating said switch means to instigate and terminate defrosting, first control means for controlling said heating element circuit, said first control means being responsive to a temperature condition affected by said cooling element for normally terminating defrosting by opening said heating element circuit before said timing mechanism actuates said switch means to open said heating element circuit, and second control means for controlling said motor circuit, said second control means being responsive to a temperature condition affected by at least one of said parts providing the path for flowing heated fluid to said cooling element for opening said motor circuit to de-energize said fan motor when said defrosting means is rendered operable and for closing said motor circuit to energize said fan motor when said defrosting means is rendered inoperable by said operation changing means and normal operation of the refrigeration system is effected.

References Cited by the Examiner

UNITED STATES PATENTS

| | | | |
|---|---|---|---|
| 2,285,884 | 6/42 | Ashby | 62—81 |
| 2,468,104 | 4/49 | Phillips | 62—81 |
| 2,691,870 | 10/54 | Smith | 62—155 |
| 2,714,293 | 8/55 | Duncan | 62—162 |
| 2,907,180 | 10/59 | Mann | 62—155 |
| 2,956,415 | 10/60 | Kogel | 62—81 |
| 3,022,639 | 2/62 | Brown et al. | 62—155 |

FOREIGN PATENTS 1,257,435  2/61  France.

ROBERT A. O'LEARY, *Primary Examiner.*

EDWARD J. MICHAEL, *Examiner.*